No. 707,928.  
M. JOHNSON.  
ATTACHMENT FOR PLANTERS.  
(Application filed June 14, 1902.)  
Patented Aug. 26, 1902.
(No Model.)
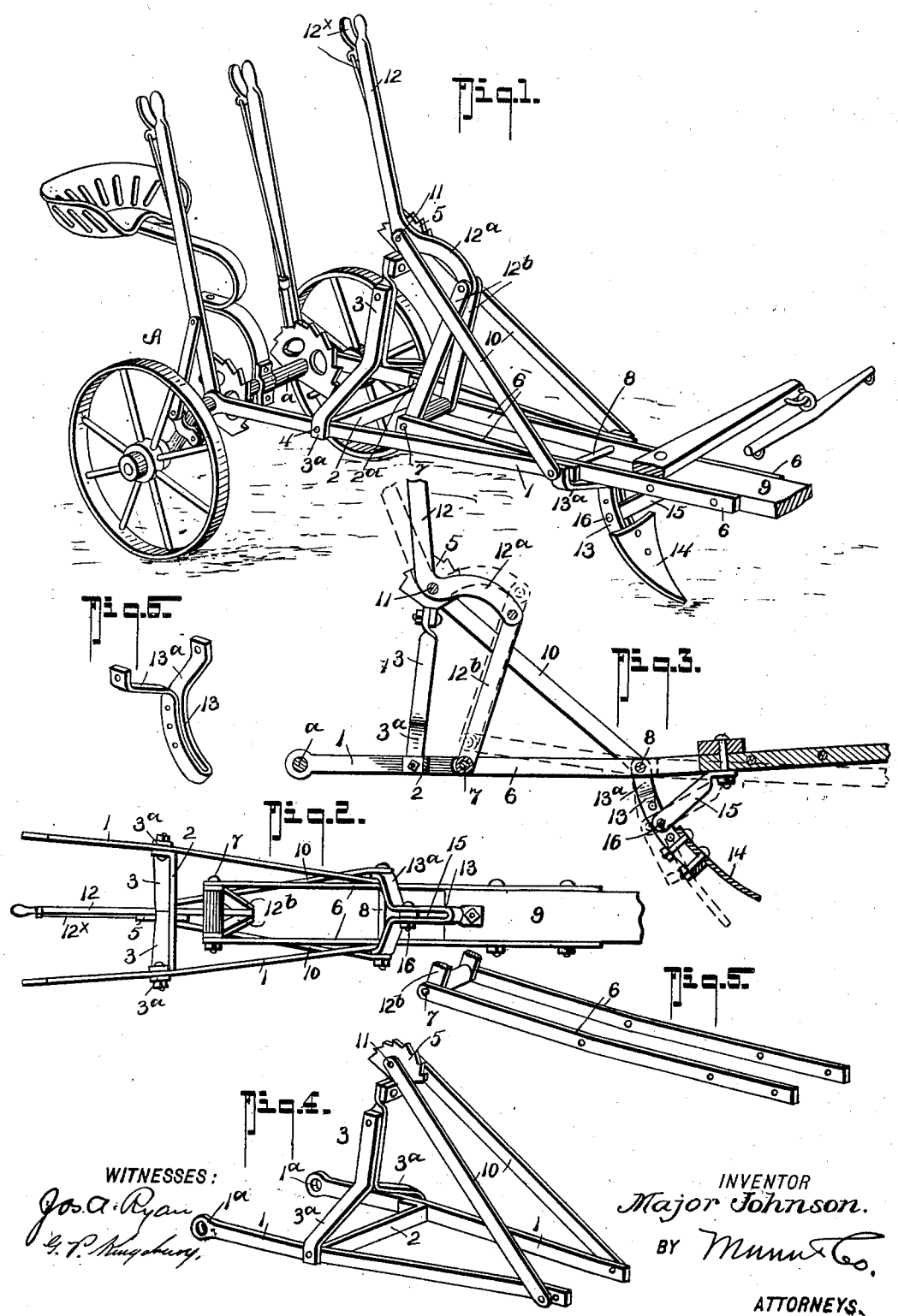
WITNESSES:  
Jos. A. Ryan  
G. P. Kingsbury
INVENTOR  
Major Johnson.  
BY Munn & Co.  
ATTORNEYS.

UNITED STATES PATENT OFFICE.

MAJOR JOHNSON, OF COLEMAN, TEXAS.

ATTACHMENT FOR PLANTERS.

SPECIFICATION forming part of Letters Patent No. 707,928, dated August 26, 1902.

Application filed June 14, 1902. Serial No. 111,719. (No model.)

*To all whom it may concern:*

Be it known that I, MAJOR JOHNSON, residing at Coleman, in the county of Coleman and State of Texas, have invented certain new and useful Improvements in Attachments for Planters, of which the following is a specification.

My invention seeks to provide a simple, inexpensive, easily-applied, and effectively-operating attachment for cotton, corn, or other seed-planting machines, in which is included a truck or carriage, whereby a sweep-plow can be connected with the planter truck or carriage for laying out a furrow and covering the seed.

In its generic nature my invention comprehends a novel construction of attachment, including means whereby the sweep can be conveniently adjusted for either smooth or rough ground and which is especially applicable for use on what is known as a "middle burster" and other carriages of similar construction, whereby to provide, as it were, three useful implements combined in one complete machine, and thereby make it more economical to utilize a planter equipped with my attachments than by using separate and distinct machines for producing the results obtainable with a machine having my improvements.

In its more complete nature my invention includes a main or body portion adapted for pivotally joining with the cross-axle of the planter-carriage, a supplemental frame rockable in a vertical plane on the body portion, a sweep mounted on the fulcrum of the supplemental frame, and a lever mechanism arranged to be near the driver's seat of the planter for conveniently controlling the sweep and the main or body portion of the attachment relatively to the tongue and the carriage or truck.

In its more subordinate features my invention consists in certain details of construction and peculiar combination of parts, all of which will hereinafter be fully explained, and specifically pointed out in the appended claims, reference being had to the accompanying drawings, in which—

Figure 1 is a perspective view of so much of a middle-burster planter as is necessary to illustrate the manner in which my improvements are used therewith. Fig. 2 is an inverted plan view of my improved attachments. Fig. 3 is a longitudinal sectional elevation of my improved attachments, parts thereof being shown in an adjusted position in dotted lines. Fig. 4 is a perspective view of the main frame or body portion of my attachment. Fig. 5 is a similar view of the supplemental frame member thereof. Fig. 6 is a view of the sweep or plow holding portion of the same.

My improved attachment comprises a main frame or body composed of two metal bars 1 1, divergingly disposed and having their widely-separated ends apertured, as at $1^a$ $1^a$, whereby the said ends can be conveniently hung upon the cross-axle $a$ of the planter truck or carriage A, as shown in Fig. 1, and to swing in a vertical plane. The bars 1 are braced and held properly separated by the cross-bar 2, having angle ends $2^a$ $2^a$ for conveniently making fast on the said bars 1, and at a point in vertical alinement with the cross-bar 2 is disposed an inverted-Y brace 3, whose lower ends $3^a$ straddle the bars 1 and are made fast thereto by the bolts or rivets 4 4, that secure the cross-bar 2, and the vertical shank of the brace 3 has fixedly joined therewith a segmental rack member 5, the purpose of which will presently appear. Between the front ends of the bars 1 1 is mounted a supplemental frame consisting of parallel bars 6 6, joined at their inner ends by a cross-bolt 7, and the said supplemental frame is joined with the front or contracted ends of the bars 1 by the fulcrum-bolt 8, whereby to provide for a vertical swing of the supplemental frame independent of the vertical swing of the main frame. The front ends of the supplemental frame are left separated to receive the rear end of the draft-tongue 9, which is securely bolted therebetween, and to the said tongue the double and single trees are connected in any approved manner, as will be readily understood from Fig. 1. The rack member 5 is also braced by the bars 10 10, the lower ends of which extend over the outside of bars 1 and are secured thereto by the fulcrum-bolt 8, and the upper ends of the two bars 10 straddle the rack member 5 and are secured thereto by the cross-bolt or stud-pin 11, made fast to the member 5. Upon the bolt or pin 11 is mounted the adjusting-lever 12, provided with the usual spring-controlled detent 12ˣ, and the said lever 12 has a forwardly-curved pendent portion 12ᵃ, which portion pivotally connects with the upper end of the diverging bars 12ᵇ, the lower ends of which join with the cross-bolt 7. (See Figs. 1 and 5.) Upon the fulcrum-bolt 8 is also hung the spread ends 13ᵃ 13ᵃ of a sweep plow-stock 13, formed of a single metal bar bent upon itself, whereby to provide a slotway for the bolts that fasten the sweep or furrow-opener 14, and the said stock 13 is securely braced by the forwardly-extending diagonal brace member 15, one end of which is bolted in the slot of the stock member 13 by a cross-bolt 16 and the other to the draft-tongue 9, as shown.

From the foregoing description, taken in connection with the accompanying drawings, it is thought that the advantages and manner of operation of my invention will be readily understood by those skilled in the art to which it appertains.

By reason of the manner in which the main frame is attached to the axle of the planter carriage or truck and the correlative arrangement of the front end of the main and the supplemental frames and the draft-tongue, together with the lever devices 12 12ᵃ, a back pull on the lever 12 to the position shown in dotted lines in Fig. 3 will swing the front end of the main frame upward and at the same time tilt the supplemental frame with it and correspondingly change the direction of the plow penetration and elevate the plow to make a shallow cut or out of contact with the soil entirely, as conditions may require, it being understood to increase the forward pitch of the sweep-plow and its penetrating depth it is only necessary to swing the lever 12 in a forward direction beyond the vertical line of its fulcrum-point.

Having thus described my invention, what I claim, and desire to secure by Letters Patent, is—

1. An attachment for plows, comprising a frame having its rear end arranged to pivotally join with the cross-axle of a planter carriage or truck, a supplemental frame having its front end arranged to join with a draft-tongue, the two frames being pivotally joined to swing in independent vertical planes, a lever mechanism mounted on the main frame, and connected with the supplemental frame at a point to the rear of its connection with the main frame, and a sweep-carrying stock mounted on the outer end of the main frame, as specified.

2. The combination with the main frame, adapted to connect with the cross-axle of a planter-truck, to swing in a vertical plane; of a supplemental frame adapted to connect with the rear end of the draft-tongue and pivoted in the forward end of the main frame to swing in a vertical plane, a sweep-carrying stock hung on the fulcrum member that connects the two frames, said stock including a brace member adapted to fasten to the draft-tongue, a lever mechanism mounted on the main frame, and connections joining the said lever mechanism with the rear end of the supplemental frame, for the purposes described.

3. In an attachment for planters of the character described, the combination with the main frame, consisting of a pair of rearwardly-diverging bars, a bracket extended vertically from the rear part of said frame, a vertically-disposed rack member fixedly held on the upper end of the said bracket, and a lever fulcrumed on the said rack to swing in a longitudinal plane, said lever having a pawl to engage the rack and provided with a forwardly and downwardly curved extension; of the supplemental frame pivotally connected with the front end of the main frame to swing in a vertical plane between the sides of the said main frame, the front end of the supplemental frame being arranged to receive and secure the rear end of the draft-tongue, a pivoted link joining the lower curved end of the lever, and the rear end of the supplemental frame; and a plow-carrying stock mounted on the forward end of the main frame, all being arranged substantially as shown and for the purposes described.

4. The combination with the main frame, consisting of the diverging bars apertured at their outer ends, the bracket member extended vertically from the rear end of the main frame and secured to the side bars thereof, the upper end of said bracket carrying a segmental rack, and the fulcrum-pin 8 mounted in the front ends of the main frame; of the supplemental frame comprising two parallel bars mounted on the fulcrum-pin 8 to swing in a vertical plane between the side bars of the main frame, the front end of the said supplemental frame being extended and arranged to connect with the rear end of the draft-tongue, a sweep-stock hung on the aforesaid fulcrum member, said sweep-stock having a forwardly-extended brace to connect with the rear end of the draft-tongue, the link-arm members pivotally connected at their ends to the segmental rack and to the fulcrum member in the front end of the main frame, the lever 12 fulcrumed on the rack, said lever having a forwardly and downwardly curved extension 12ᵃ, and pivotal links joining the said extension with the rear end of the supplemental frame, all being arranged substantially as shown and described.

MAJOR JOHNSON.

Witnesses:
J. C. DUNN,
J. E. LONG.